United States Patent [19]

Skates

[11] Patent Number: 4,641,745
[45] Date of Patent: Feb. 10, 1987

[54] ADJUSTABLE SKIRT HOLDER FOR CONVEYOR

[75] Inventor: Raymond E. Skates, Mission Hills, Kans.

[73] Assignee: Kansas City Rubber and Belting Company, Kansas City, Mo.

[21] Appl. No.: 748,038

[22] Filed: Jun. 24, 1985

[51] Int. Cl.⁴ .............................................. B65G 21/20
[52] U.S. Cl. .................................. 198/836; 198/860.3
[58] Field of Search ..................... 198/836, 525, 860.3, 198/860.1

[56] References Cited

U.S. PATENT DOCUMENTS

| | | | |
|---|---|---|---|
| 2,681,134 | 6/1954 | White | 198/836 |
| 2,883,035 | 4/1959 | Erisman | 198/836 |
| 2,988,202 | 6/1961 | Pampel et al. | 198/836 |
| 2,989,170 | 6/1961 | Michaelson et al. | 198/836 |
| 3,024,893 | 3/1962 | Lambert | 198/836 |
| 3,169,633 | 2/1965 | Baker | 198/836 |
| 3,344,909 | 10/1967 | Hansen et al. | 198/836 |
| 3,499,523 | 3/1970 | Clegg | 198/836 |
| 4,204,595 | 5/1980 | Marrs | 198/836 |
| 4,231,471 | 11/1980 | Gordon | 198/836 |

FOREIGN PATENT DOCUMENTS

| | | | |
|---|---|---|---|
| 2418458 | 10/1975 | Fed. Rep. of Germany | 198/836 |
| 2416963 | 10/1975 | Fed. Rep. of Germany | 198/525 |
| 1452247 | 10/1976 | United Kingdom | 198/836 |
| 346909 | 4/1981 | United Kingdom | 198/836 |

Primary Examiner—Joseph E. Valenza
Assistant Examiner—Jonathan D. Holmes
Attorney, Agent, or Firm—Schmidt, Johnson, Hovey & Williams

[57] ABSTRACT

Flexible skirts which engage the tops of the belts of conveyors are suspended from the sidewalls of the cover of conveyor by vertically adjustable skirt holders. Elongated plates engaging the walls have outwardly extending, U-shaped humps. U-shaped skirt clamping jaws are looped over the humps. Fasteners include eyebolts passing through the bights of the jaws with their eyes disposed in slots formed in the bends of the humps. The eyes are free to rock about a rod secured to the humps at their bends.

12 Claims, 3 Drawing Figures

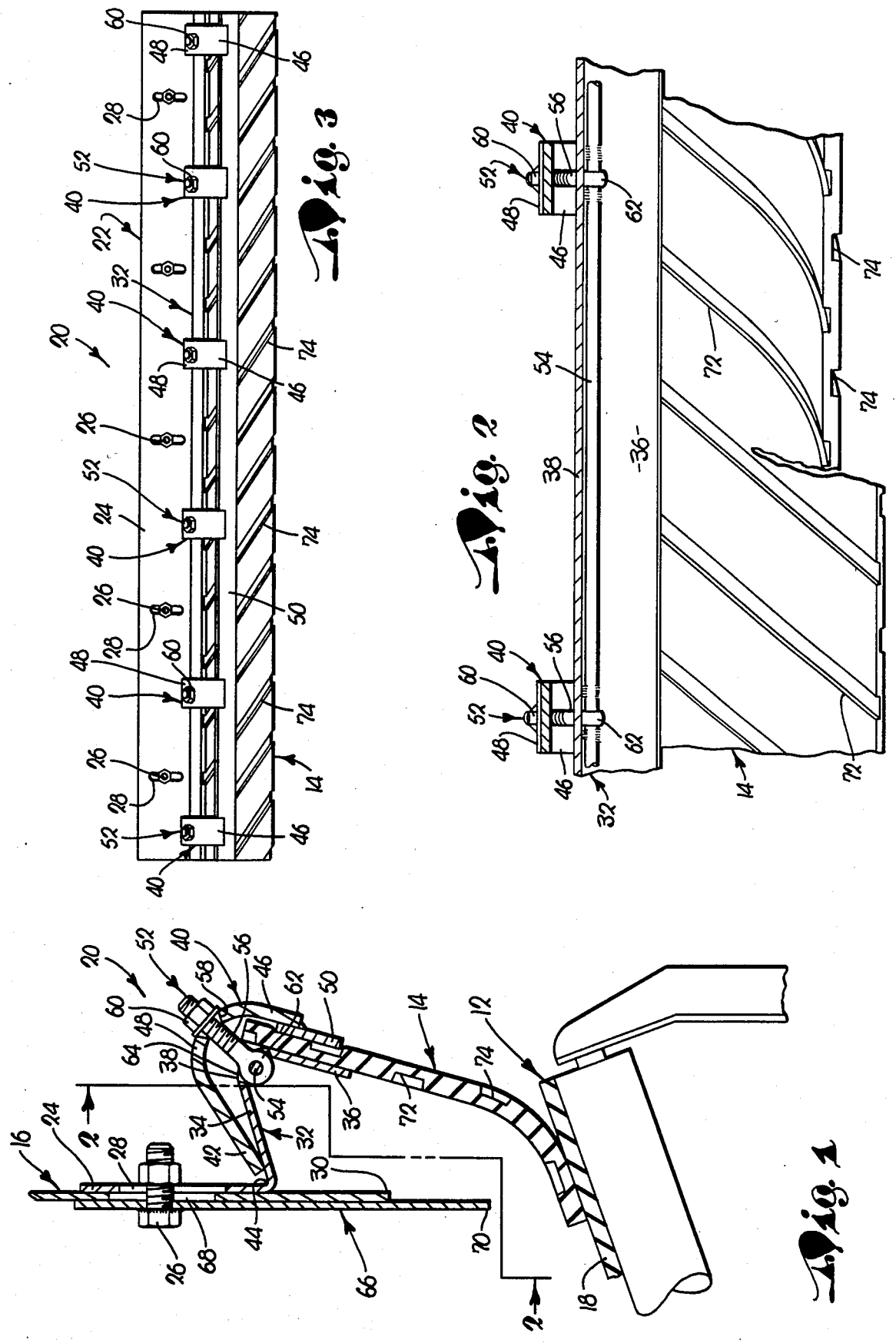

ADJUSTABLE SKIRT HOLDER FOR CONVEYOR

BACKGROUND OF THE INVENTION

Field of the Invention

The present invention relates to holders for conveyor belt skirts embodying bracket-like attachments to the sides of the conveyor hood or other supports and a series of jaws for clamping the skirts to the attachment.

SUMMARY OF THE INVENTION

Material advancing conveyor belts are oftentimes provided with overlying, dust-confining hood-like covers therealong or open framework and with flexible, belt-engaging, sealing skirts for precluding discharge of the materials laterally of the belt. Holders for suspending the skirts from their supports must have a high degree of adjustability in order to maintain the skirts in proper engagement with the belt for assuring effective seals against lateral escape of the particulate material and the dust off the top of the belt beneath the skirts. Moreover, the holders must have a minimum of parts such that attachment to the walls and all adjustments can be made quickly and easily without need for skilled labor.

All of such requirements are met through use of the holder of my present invention, first because of its consisting of but two parts other than nuts and washers. In conjunction therewith, the holders, made of skirt-clamping jaws looped over humps, are advantageously equipped with novel fasteners in the nature of eyebolts which may be rocked about rigidly mounted rods. A multiplicity of major and fine adjustments are made possible by slots in support-engaging plates, slots which clear the eyes of the eyebolts and bolt-clearing slots in the jaws themselves.

Additionally, in combination with the holders, I provide a panel, using the same adjustment bolts as the plates of the humps, for reducing the amount of larger materials passing from the belt onto the skirt and thence upwardly toward the bend of the hump.

The instant invention is related to my U.S. patent application Ser. No. 118,474, entitled "Adjustable Skirt Holder for Conveyors", filed Feb. 4, 1980 and abandoned on June 9, 1981.

IN THE DRAWINGS

FIG. 1 is an enlarged, fragmentary, vertical cross-sectional view through the conveyor belt, one of the sidewalls of the conveyor hood, one of the skirts and the corresponding holder;

FIG. 2 is a fragmentary, cross-sectional view taken on irregular line 2—2 of FIG. 1, showing not only the appearance of the inner face of the skirt when hanging vertically but such appearance when bent inwardly along the belt; and FIG. 3 is a fragmentary, outer, side elevational view of one of the sections with its holder in relation to a skirt.

DESCRIPTION OF THE PREFERRED EMBODIMENT

The holders which form the subject matter of my present invention are for use with a cover or hood for a belt conveyor 12 to support elongated, flexible skirts 14 depending from sidewalls 16 of the cover and terminating in sealing engagement with belt 18 of the conveyor 12. If, on the other hand, no such hood is provided for the belt 18, with no available sidewalls 16, as shown, the holders will be attached, as explained below, to suitable frameworks (not shown) in lieu of the sidewalls 16.

Accordingly, each holder 20 may be in the form of a section 22 of preselected length, e.g., five feet, and include an elongated plate 24 all of which plates 24 flatly engage the outer faces of the walls 16. Releasable means 26 such as bolts and nuts, passing through a number of upright slots 28 in the plates 24, are used to mount the plates 24 on the walls 16 adjacent but spaced above the lower longitudinal edges 30 of the walls 16.

FIG. 3 of the drawings shows, by way of example only, one section 22 with six spaced jaws 40 and with six spaced slots 28, and as above indicated, the bolts 26 may well pass through suitable framepieces (not shown) rather than through walls 16 of a hood for the conveyor 12.

Coextensive in length with each plate 24 is a lower, transversely U-shaped hump 32 having an upper, outwardly and upwardly extending arm 34 integral with the plate 24. Each hump 32 is also provided with a downturned arm 36 which slopes inwardly toward the wall 16. An intermediate, transversely arcuate upper bend 38 integrally joins the arms 34 and 36. The lengths of the arms 34 and 36, and of the bend 38 are, manifestly, the same as the length of the plate 24 making up one of the sections 22.

Spaced along and looped over each hump 32 are a number of upper, transversely U-shaped jaws 40. Each jaw 40 has an upper leg 42 which slopes downwardly and inwardly toward the plate 24, terminating in engagement with the top of the arm 34 adjacent but spaced outwardly of line 44 of transversely arcuate joinder between the plate 24 and the arm 34.

Each jaw 40 is also provided with a downturned leg 46 spaced outwardly of the arm 36 and parallel with the latter along the lower marginal edge of the leg 46. Moreover, each jaw 40 has an intermediate, transversely arcuate, upper bight 48 integrally joining the legs 42 and 46. The bights 48 are spaced upwardly and outwardly of the bend 38. Once again, while the jaws 40 are relatively narrow, the legs 42, 46 and the bight 48 extend entirely thereacross. Rigidly fixed to the legs 46 of all the jaws 40 as by welding, is an elongated bar 50 having the same length as the hump 32. The bar 50 extends along the inner marginal edges of the legs 46 and depends therefrom in spaced, parallel relationship to the arm 36.

Each jaw 40 has a releasable fastener 52, and common to the jaws 40 is an elongated rod 54 having the same length as that of the hump 32. The rod 54 engages the concave face of the bend 38 and is rigidly secured to the hump 32, as by welding. Each fastener 52 is in the nature of an eyebolt 56, and passing through a slot 58 in the bight 48, having an upper nut 60 at the convex face of the bight 48. Eyes 62 of the bolts 56 receive the rod 54 and are cleared by slots 64 in the bend 38.

Hence, the two-part assembly (the hump 32 with its fasteners 52 and the bar 50 with its jaws 40) operates to clamp the skirt 14 between the bar 50 and the arm 36 when the nuts 60 are tightened on the bolts 56. The slots 28 and 58 provide for quick and easy adjustments for proper clamping of the holders 20 to the skirts 14 and proper sealing engagement of the skirts with the belt 18. Noteworthy is the freedom of rotation of the eyes 62 on the rod 54 within the slots 64 and the free movement of the legs 42 along the arm 34 toward and away from the plate 24 during adjustment.

The jaws 40 may be rocked relative to the hump 32 because of the slots 58 and because of the freedom of the eyes 62 to rotate about the rod 54 within the slots 64 as the leg 42 shifts along the arm 34 toward and away from the line 44. To also assure proper engagement of the skirt 14 with the belt 18, the plate 24 may be shifted up and down because of its slots 28 which receive the bolts 26 but the rod 54 holds the bolts 56 against turning as the nuts 60 are tightened and released.

In combination with all of the above, I provide an elongated panel 66 extending along the plates 24, using the same bolts 26 for mounting purposes and for vertical adjustment of the panels 66. Hence, the bolts 26 are rigid to the panel 66 and shiftable vertically along slots 68 in the wall 16 or other supporting frame pieces. Therefore, the distance between lower edge 70 of the panel 66 and the skirt 14 may be varied at will. It is contemplated that such distance be chosen such as to preclude movement of large particles being conveyed by the belt 18 upwardly and outwardly along the skirt 14 toward the bend 38 of the hump 32. The panel 66 will also tend to prevent upward and outward movement of conveyed materials between the belt 18 and the skirt 14. The panels operate, therefore, to reduce wear on the skirt 14 threabove and therebelow. Here again, the bolts 26 will not turn as their nuts are tightened and released.

To further reduce wear on the skirts 14, I provide a series of transverse, inclined grooves 72 and 74 in the inner and outer faces respectively of the skirts 14. The spacing and angularity are somewhat optional but an angle of about 45° has proved to be most effective. Also, the depth and width of the grooves 72, 74 may be chosen as conditions dictate.

With respect to the grooves 72, all material rising along the skirt 14 from beneath the edge 70 and entering the grooves 72 will gravitate back along such grooves onto the belt 18 rather than become lodged or dragged along by the belt 18, thereby reducing wear on the skirt 14, especially along the lower, top margin of the skirt 14. The grooves 72 should, as shown in FIG. 2, slope downwardly and rearwardly with respect to the direction of travel of the belt 18.

By providing the grooves 74, the skirts 14 may be relocated in a number of positions as wear takes place, e.g., inside-out, top to bottom and from one side to the other side of the belt 18.

I claim:

1. A holder adapted for suspension from a support for maintaining an elongated, flexible skirt in sealing engagement with a conveyor belt, said holder comprising, in combination with said skirt:
    an elongated plate;
    releasable means for mounting the plate on said support;
    a lower, transversely, U-shaped hump coextensive in length with the plate, having an upper arm integral with the plate and extending outwardly therefrom, a downturned arm spaced outwardly of said plate and an intermediate, transversely arcuate, upper bend integrally joining the arms;
    a series of upper, transversely U-shaped jaws looped over and spaced along said hump,
    each jaw having an upper leg engaging the top of the upper arm, a downturned leg spaced outwardly of the downturned arm and an intermediate, transversely, arcuate, upper bight integrally joining the legs and spaced upwardly of the bend;
    an elongated bar coextensive in length with the hump, interconnecting the downturned legs and spaced outwardly of the downturned arm; and
    a releasable fastener having a portion thereof common to the jaws and connecting the latter with the hump at the bend and at the bights for clamping the upper marginal edges of the skirt between the bar and the downturned arm with the skirt depending from said bar and downturned arm.

2. The invention of claim 1, said bend having an inner concavity, said portion being a rod coextensive in length with the hump and engaging the latter within said concavity.

3. The invention of claim 2, said fastener including an eyebolt for each jaw respectively, said rod extending through the eyes of said eyebolts.

4. The invention of claim 3, said rod being rigidly secured to the hump.

5. The invention of claim 4, said bend having clearance slots for said eyes, rendering the bolts swingable relative to the rod.

6. The invention of claim 5, the bolts extending through the bights and terminating in nuts above the bights.

7. The invention of claim 6, the bights having clearance slots for said bolts rendering the jaws rockable relative to the humps.

8. The invention of claim 1, said releasable means being a series of elements spaced along the plate, there being a slot in the plate for each element respectively rendering the plate vertically shiftable, each element having a nutreceiving screw thread.

9. The invention of claim 8; and an elongated panel along the plate suspended from the support and provided with a lower, longitudinal edge spaced above the belt.

10. The invention of claim 9, said elements being rigid to the panel, there being a slot in the support for each element respectively rendering the panel vertically shiftable.

11. The ivnention of claim 1, said skirt having an inner face provided with a series of spaced, inclined grooves for returning conveyed materials to the belt which tend to collect on said face.

12. The invention of claim 11, said grooves sloping downwardly and rearwardly with respect to the direction of travel of the belt.

* * * * *